April 22, 1958  S. R. OVSHINSKY  2,831,387
TOOL-FEEDING MEANS

Filed June 29, 1953  3 Sheets-Sheet 1

INVENTOR.
STANFORD OVSHINSKY
BY
Mitchell & Bechert
ATTORNEYS

April 22, 1958 S. R. OVSHINSKY 2,831,387
TOOL-FEEDING MEANS
Filed June 29, 1953 3 Sheets-Sheet 2

INVENTOR.
STANFORD OVSHINSKY
BY
Mitchell & Bechert
ATTORNEYS

April 22, 1958 S. R. OVSHINSKY 2,831,387
TOOL-FEEDING MEANS
Filed June 29, 1953 3 Sheets-Sheet 3

INVENTOR.
STANFORD OVSHINSKY
BY
Mitchell & Bechert
ATTORNEYS

United States Patent Office 2,831,387
Patented Apr. 22, 1958

2,831,387

TOOL-FEEDING MEANS

Stanford R. Ovshinsky, Detroit, Mich., assignor to The New Britain Machine Company, New Britain, Conn., a corporation of Connecticut Application June 29, 1953, Serial No. 364,818

25 Claims. (Cl. 82—24)

My invention relates to automatic machine tools and, in particular, to an improved automatic feed for a tool and work relatively to each other.

It is an object of the invention to provide improved means of the character indicated.

It is another object to provide improved feed means whereby a precise depth of cut may be achieved independently of tool wear, or of other possible sources of inaccuracy, as in the tool-feed mechanism.

It is also an object to provide improved automatic profile-cutting mechanism, specifically wherein simplified means may selectively control the profile contour.

A further object is to provide improved means for varying the depth of cut in one coordinate of feeding motion as a function of the feed along another coordinate.

It is a specific object to meet the above objects with a device in which depth of cut (as in application to a lathe) may be adjustably selected by simple manipulation of knobs, and in which the traverse for any particular depth of cut may also be readily selected.

Other objects and various further features of novelty and invention will be pointed out or will occur to those skilled in the art from a reading of the following specification, in conjunction with the acompanying drawings. In said drawings, which show, for illustrative purposes only, preferred forms of the invention:

Briefly stated, the invention seeks to produce accurate positioning of a tool with respect to work, regardless of wear on the tool, by employment of a probe tracking the actual cut on the work, and by utilizing the placement of the probe (with respect to a frame-based reference) to derive a control signal for advance or retraction of the tool. The means for detecting the probe position with respect to the frame-based reference may be electrical, as, for example, an impedance that is variable in accordance with probe position, said impedance characterizing one arm of a bridge circuit; the frame-based reference may be another impedance in the conjugate arm of the bridge, and control connections are such that the tool will always be driven in a direction to produce bridge balance. By making said further impedance selectively variable, one may, by simple manipulation, selectively vary the depth of cut, regardless of tool wear and regardless of any other inaccuracies in the tool-positioning mechanism.

The principle of my invention is applicable to many types of automatic tools, but in the forms to be described, the invention is applied to a lathe including rotatable work-supporting means, and the tool and probe are both carried by the traverse slide, the tool being supported by the cross slide for operation on the work at a location substantially diametrically opposed to the probe location. In one form, the probe is movably oriented with respect to a reference fixed to the traverse slide, to follow the cut of the tool on a piece of work; and a variable resistance responsive to probe position controls cross-slide position at all times, through a bridge-type circuit. In another general form, the probe is movably mounted on a second cross-slide, which may be guided in the same ways (on the traverse slide) as is the tool-carrying cross-slide. In the latter case, a variable resistance may track the instantaneous position of one or the other of these slides when positioned by common feed means, but once a given cutting radius has been located through the bridge circuit, automatic means may declutch the probe-supporting cross-slide from the common feed means, so as in effect to anchor the probe-supporting cross-slide to the traverse slide; thereafter, null-finding sensing means may control the position of the tool-carrying cross-slide. Thus, for both general forms of the invention, even though the tool wears during the progress of a cut, the probe will assure (through the null-finding reference system) that the same diameter, or a desired diameter, will always be turned. Various further features will be described for automatic sequencing of control functions.

Figure 1:
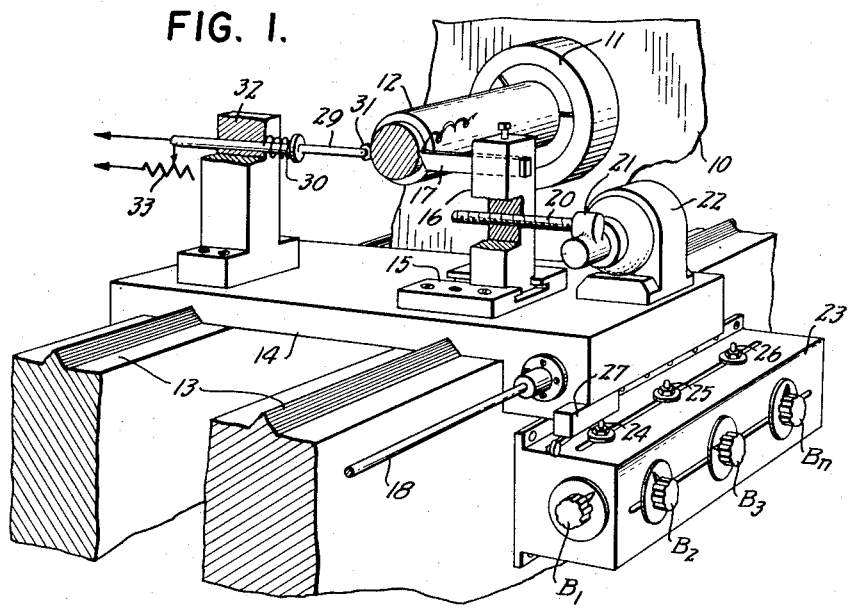
Fig. 1 is a simplified view in perspective illustrating components of a machine embodying features of the invention.
Figure 2:
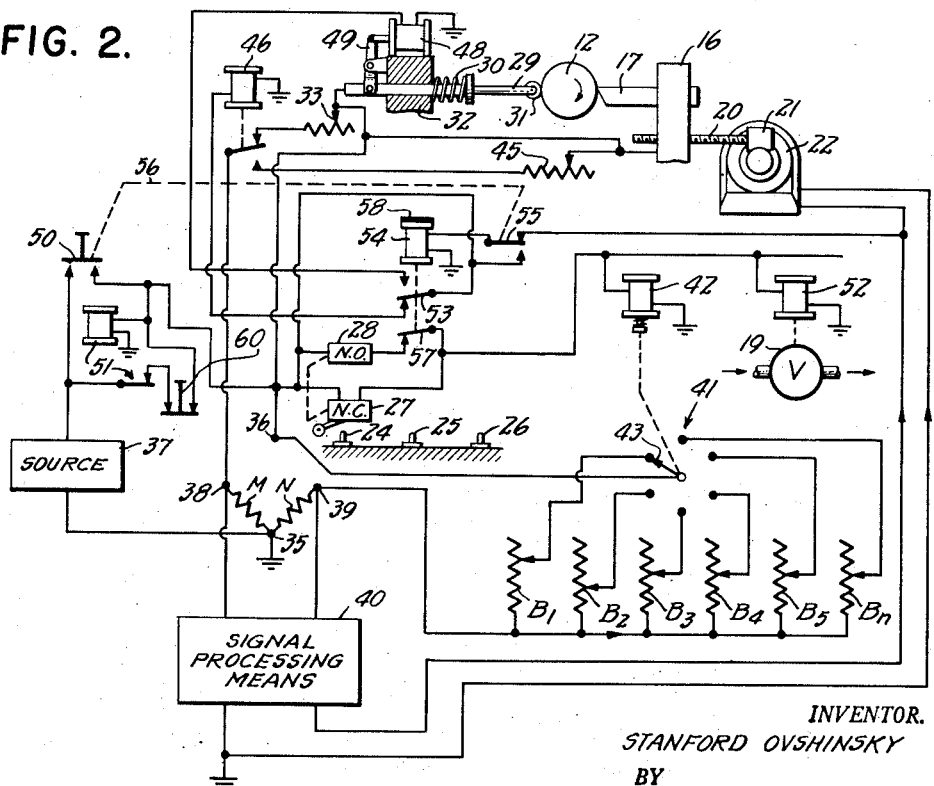
Fig. 2 is an electrical diagram schematically illustrating control connections for the mechanism shown in Fig. 1.

Referring to Figs. 1 and 2 of the drawings, my invention is shown in application to a lathe having a front face 10 with chucking means 11 for revolubly supporting a piece of work 12. The lathe may include spaced ways 13 for guiding a traverse slide 14; and the traverse slide 14 may include guide means 15 for tool-carrying cross-slide means 16. Although the tool 17 is shown supported in an exaggerated projected position, it will be understood that this and other exaggerations in the drawing are for the purpose of more clearly illustrating the parts, rather than for the purpose of indicating preferred proportions.

Automatic feed means may be provided for both slides 14—16, and it will be understood that the rod 18 schematically indicates feed means for the traverse slide 14. The rod 18 may be a piston rod, forming part of hydraulic-feed mechanism not shown in further detail, but said feed mechanism may be automatically controlled by on-off valve means 19, designated schematically in Fig. 2. The cross-slide feed means may also be hydraulically controlled, but in the form shown, I have illustrated a lead screw 20 driven, through reduction gearing 21, by an electric motor 22.

In accordance with the invention, I provide automatic means whereby the depth of cut may always be referenced in a known manner to the frame so that the depth may be maintained, within the limits of performance of the mechanism, regardless of tool wear, and regardless of functional inaccuracies in one or both of the feed mechanisms. The only set-up operation required in order to achieve a given cutting radius for a given traverse distance is the proper setting of one or more selectable control knobs $B_1$—$B_2$—$B_3$ . . . $B_n$, depending upon the desired number of different radii to be cut throughout a given traverse. The control elements $B_1$—$B_2$ . . . $B_n$ may all be contained in a simple conveniently located control box 23 which I have shown secured to the frame on the operator's side of the lathe 10; the control box 23 may also carry adjustably positionable tripping abutments 24—25 . . . 26 for determining the traverse location at which various controlled radii are to be established. The tripping abutments are shown to be received in an elongated slot and may thus be set for function at any selected traverse position permitted by the length of the slot. A simple limit switch 27 carried on the underside of the traverse slide 14 may strike the successive abutments 24—25—26 in order to initiate the transfer functions, controlling a shift in tool position from one desired cutting radius to the next, as will be more clearly pointed out.

As indicated generally above, accurate control of the depth of cut is maintained through the employment of probe means 29, mounted for transverse movement with respect to a frame-based longitudinal axis and oriented to track the depth of cut by the tool 17. I have shown the probe 29 as a roller-tipped rod normally urged by spring means 30 radially against the work at a location generally diametrically opposed from the location of cutting. Although not clearly or specifically shown, it is preferred that the roller 31 of the probe means shall be relatively thin (axially) and that its leading edge shall be aligned as nearly as possible with the front edge of the cut that is being made. Since, in the lathe shown, it is necessary that the probe means 29 shall follow the progress of a traverse, I have shown probe-support means 32 mounted on the traverse slide 14; support means 32 will be understood to provide the desired reference to a frame-based longitudinal axis.

Depending upon the type of feed mechanism employed for the cross slide, various automatic-sensing means may respond to probe position in order to control the cross-slide feed mechanism; for example, in a fluid-pressure-operated cross-slide feed, the probe 29 may set the opening in a variable orifice in the control-fluid line. However, in the form shown, the cross-slide feed-means is electrical, and I have illustrated electrical control means therefor. The electrical control means may include an impedance, such as resistor 33. Impedance 33 may include an element fixed to support 32 and a movable element fixed to probe 29; impedance 33 may, therefore, be variable in accordance with probe position and connected in controlling relation with motor 22.

In the form shown in Fig. 2, cross-slide feed control is effected through a bridge circuit having arms M—N with fixed impedances and energized, by a source 37, across one pair of opposite corners 35—36. Bridge output may be taken from the other pair of opposite corners 38—39 and, after appropriate treatment in signal-processing means 40, may be applied to the directional control of motor 22. I have shown the sensing impedance 33 connected in one of the remaining arms (between points 36—38) of the bridge, and a selected one of the reference impedances (which in turn may be selectively variable) is connected in the remaining bridge arm, between points 36—39. Since the cross-feed control is electrical in the form shown, the control knobs on the box 23 may form part of variable resistors $B_1$—$B_2$ $B_3$ . . . $B_n$ for potentiometers (which may be of the multiturn variety), similarly labeled in Fig. 2; for purposes of inserting a selected one of these variable impedances in the reference arm (36—39) of the bridge, I show selector-switch means 41, which may be of the one-way advancing, step-switch variety, having a single actuating solenoid 42 for advancing the contact arm 43 from one contact connection to the next, for each actuating movement of solenoid 42.

The described principal parts may alone be relied upon (with suitable automatic electric interconnections) for the automatic controlled positioning of the cross-slide 16, so as to determine depth of cut independently of tool wear, regardless of the traverse position. However, in the form shown in Fig. 2, I have illustrated a slightly more elaborate control system wherein, for any repositioning to a new cutting radius, primary sensing for determing position of cross-slide 16 is effected through a variable sensing impedance 45, variable in accordance with the position of cross-slide 16 and independent of the positioning of probe 29. For this purpose, a relay 46 may temporarily transfer the sensing function from the probe impedance 33 to the cross-slide impedance 45, and back again, as determined by automatic functions of control circuits to be described. The purpose of providing this refinement in the automatic positioning of cross-slide 16 is to permit the temporary retraction of the probe 29 while changing radii, so as to make sure that the probe tip does not become fouled in the work. For this purpose, I have shown solenoid means 48 mounted on the probe pedestal 32 and functioning, through rocker arm 49, to retract the probe 29.

The operation of the described parts will be better understood from the description of a typical cycle of operation, commencing before the tool 17 enters the work, that is, with the traverse slide far enough to the left, in the sense of Fig. 1, for the tool 17 to clear the work. Let it be assumed that the operation to be performed is one of step-turning, involving a given succession of constant-radius cuts for various traverse distances. Thus, the first cut, as determined by reference potentiometer $B_1$, may be of relatively small radius and may last (in terms of traverse-feed distance) from the time the tool enters the work until limit switch 27 is tripped by abutment 24. The second cut may be of relatively large radius, as determined by the potentiometer $B_2$, and may last until limit switch 27 is tripped by abutment 25. Similar cuts may take place for various further radii and traverse distances, until a final abutment 26 determines transfer of cutting radius to that determined by the final potentiometer $B_n$. Determination of the length of traverse at this final cutting radius may be effected automatically and in a manner well known to those skilled in the art, as, for example, by a limit switch (not shown) carried by the traverse slide 14 and striking a frame-based abutment as the tool slide nears the front face 10 of the machine; such limit switch may serve to disable the traverse feed.

As indicated, it has been assumed that the mechanism is at rest and that the tool 17 has not yet engaged the work at the left end of the traverse. Upon pushing the start button 50, a hold-in relay 51 is energized to complete the circuit to solenoid 42 for selector switch 41, and to solenoid 52 for the traverse-feed valve 19. Selector step switch 41 then becomes enabled to transfer the selector arm 43 when solenoid 42 later becomes de-energized, so that as long as slide 42 remains energized, the arm 43 will stay in the position shown, i. e. that of connecting the first potentiometer $B_1$ in the reference arm 36—39 of the control bridge. Meanwhile, the operation of solenoid 52 will start the traverse feed, and the traverse slide 14 will advance the tool 17 laterally toward the work.

In order that the probe 29 shall not be endangered before the tool enters the work, I provide means coordinated with the operation of the start button 50 to assure that the probe 29 shall be retracted until the tool has safely entered the work. For this purpose, I have shown a simple manual switch 55, which may be coordinated, as suggested by the dotted line 56, to function with the start button 50, so that a single press of the start button 50 will not only start the traverse feed, but will depress switch 55 to apply operating voltage directly to a relay 54, thus raising the two contact arms 63—57 thereof to activate solenoid 48 for retracting probe 29. As long as relay 54 is energized, that is, as long as the push button 50—55 is held in, relay 46 will be de-energized, thereby connecting the cross-slide sensing potentiometer 45 in the sensing arm 36—38 of the bridge circuit, so that at least for the beginning of the first cut of the tool in the work, the cross-slide position and, therefore, the tool position will be the medium of reference, rather than the depth of cut itself. Upon release of the start button 50, hold-in relay 51 will function to maintain the traverse feed, but switch 55 will be released, to allow probe 29 to follow the cut, and to energize relay 46, thereby connecting the probe-sensing impedance 53 (rather than the cross-slide sensing impedance 45) in the sensing arm 36—38 of the bridge. It will be noted that, even though the tool should wear during the progress of the cut determined by the first reference potentiometer $B_1$, the probe 29 will generate error signals in the bridge if there is any tool wear, because the bridge will only balance for a given measured depth of cut which, of course, is quite independent of tool wear and of any mal-functioning in the cross-slide feed mechanism.

At the traverse position at which the first cut is to be terminated, the normally closed limit switch 27 will be tripped by the first abutment 24, so as to open the circuit to solenoids 42—52, thereby immediately transferring the selector arm 43 to the next reference impedance $B_2$ and cutting off the traverse feed at valve 19. Because of the changed reference impedances, as between $B_1$ and $B_2$, with no immediate change in the sensed impedance at 33, the bridge output will be characterized by an immediate abnormally large (error) signal which will, of course, drive the motor 22 in the correct direction, but which will also again energize the relay 54 so as to retract the probe 29 and to transfer positioning control to the cross-slide sensing potentiometer 45. When a new cutting radius has been reached, the cross-slide feed signal will have been reduced to substantially zero, so that relay 54 will become de-energized and will seek to drop out. For safety purposes, I prefer that the relay 54 be of the delayed drop-out variety, as suggested by the heavy shading 58, so that there will be a momentary delay, after the cross-slide feed signal has been reduced substantially to zero (and before the probe is returned to track the work), that is, before control is restored to the probe sensing impedance 33. When relay 54 finally does drop out, the circuit is completed (through contacts 28—57) to solenoids 42 and 52; traverse feed then resumes, the selector switch 41 is again enabled, and the described cycle of operations repeats. The described cycle may be repeated as frequently as necessary, depending upon the number of steps to be turned on the work 12. Also, as indicated generally above, any cycle of operations may be stopped automatically by means of a traverse-limit switch (not shown), or, as in the case shown, a manual stop button 60 in the hold-in circuit for relay 51 will accomplish this purpose.

Figure 3:
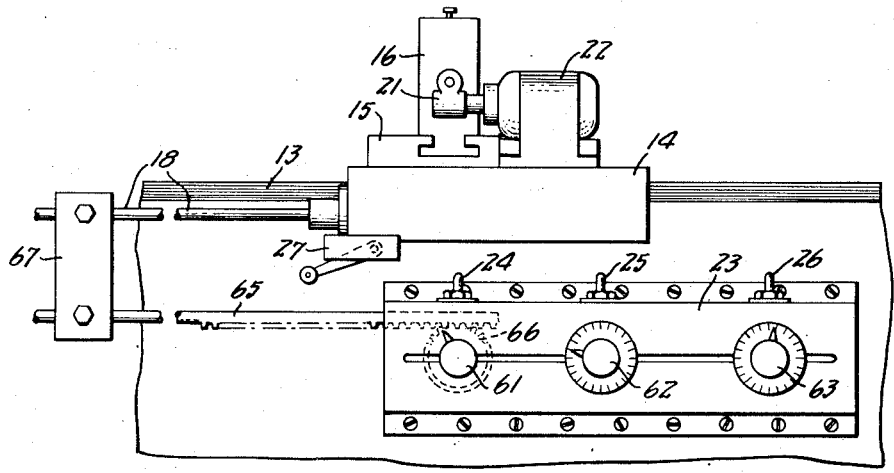
Fig. 3 is a fragmentary side elevation of parts illustrating a modification of the mechanism of Fig. 1.

For simplicity, the arrangement of Figs. 1 and 2 has been shown for the case of step-turning at discrete preselected radii, but it will be understood that variously characterized cuts may be made by continuously variable programs establishd in the control box 23. A simple mechanism for generating the characterized cut is briefly illustrated in Fig. 3, wherein parts common to the described figures are given the same reference numbers. In Fig. 3, I show application of a characteristic function only to the first 61 of several control potentiometers (including potentiometers 62 and 63) in the control box 23, but it will be understood that the members to be described in connection with the potentiometer 61 may be equally applicable for the operation of the other potentiometers 62—63. In order to derive an impedance that varies as a function of traverse position, I show a rack 65 oriented generally parallel to the traverse-feed means 18 and meshing with a pinion 66 on the shaft of potentiometer 61. A strap or yoke 67 interconnects the rack 65 and the traverse-feed means 18, so that the potentiometer 61 is actuated as a function of traverse movement. If the potentiometer 61 is a linear potentiometer, then depending upon the radius of the pinion 66 in terms of a total traverse distance for which potentiometer 61 is to provide a reference, a tapering cut (with a particular taper angle) will be generated on the work. If the potentiometer 61 is non-linear as, for example, with a logarithmic, parabolic, or other characteristic, then a similar logarithmic, parabolic, or other characteristic may be generated in the taper as a function of traverse distance; again, the range of radii over which this non-linear characteristic is developed (as a varying depth of cut) will depend upon the radius of the pinion 66 and upon the length of the traverse over which the function is generated. It will be understood that if more than one potentiometer is to provide a characteristic cut, then the rack 65 may extend longitudinally to the extent necessary to mesh with further pinions on the necessary potentiometer shafts, as in the case of the pinion 66 on the shaft of potentiometer 61.

Figure 4:
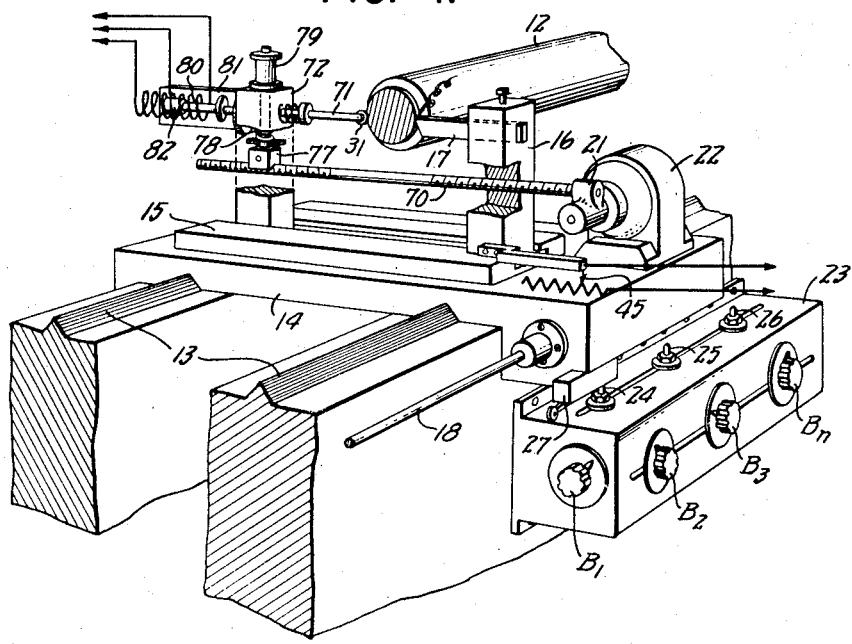
Fig. 4 is a fragmentary view in perspective illustrating a further modification.
Figure 5:
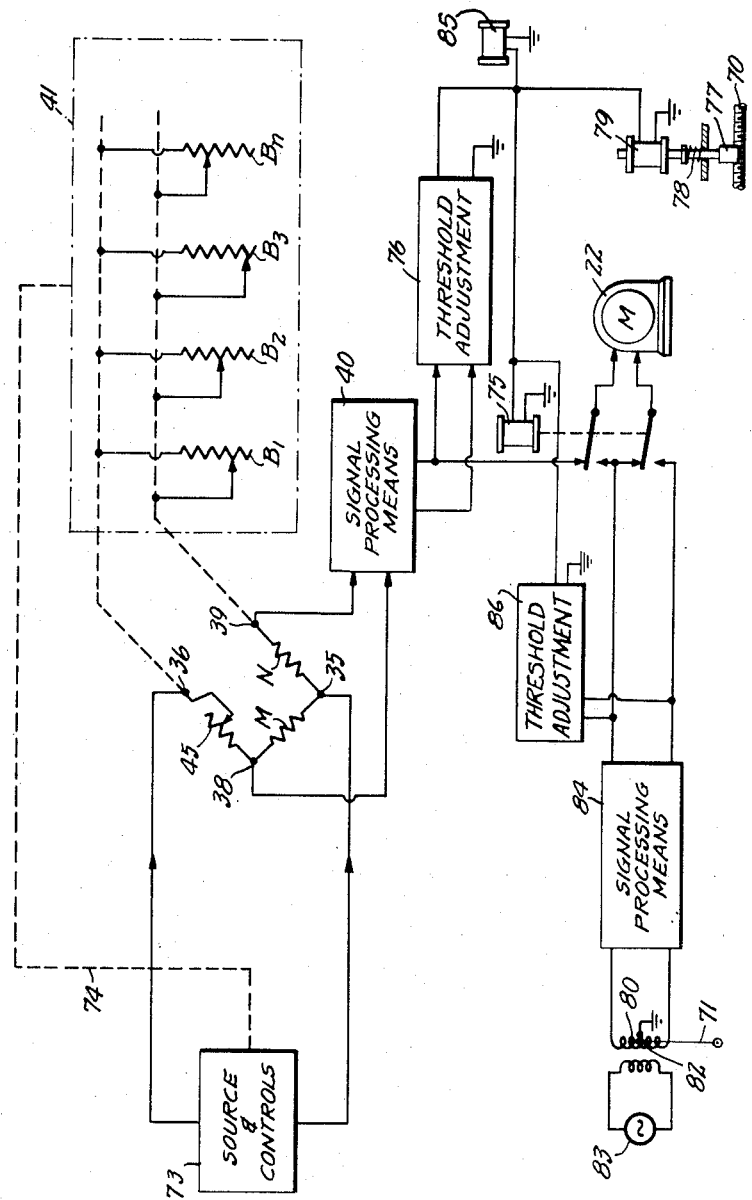
Fig. 5 is another electrical diagram, illustrating control connections for the parts of Fig. 4.

In Figs. 4 and 5, I show a slightly modified form of cross-slide positioning mechanism incorporating the same basic features of the invention as already described in connection with Figs. 1 and 2; thus, in Fig. 4, the tool-supporting cross-slide 16 is mounted on transverse ways 15 on a traverse slide 14, and electrically operated cross-slide feed means serves (through a lead screw 70) to position the cross-slide 16. For certain parts of the cycle, the cross-slide sensing potentiometer 45 may determine cross-slide position as referenced to the setting of a particular one of the variable reference potentiometers $B_1$—$B_2$ . . . $B_n$.

The arrangement of Fig. 4 differs from the arrangement of Fig. 1, in that the physical frame-based reference pedestal or support 72 for the probe means 71 may be repositioned for each cutting step. Thus, the mount or pedestal 72 for the probe means 71 may be a second cross-slide, guided in the ways 15 and deriving feeding movements from the same cross-slide feed means 70 as does the tool-carrying cross-slide 16. Because the slides 16—72 are on opposite sides of the work, any repositioning of the tool-carrying cross-slide 16, when transferring from one cutting radius to another, should be accompanied by an equal and opposite movement of the probe-supporting cross-slide 72; thus, I have shown the feed means 70 as a differential screw.

Insofar as the potentiometer 45 serves to position the cross-slides 16—72, the operation of my circuit may be as described in connection with Fig. 2 and, therefore, the circuit of Fig. 5 has been considerably simplified, with the understanding that certain elements of the circuit of Fig. 2 (schematically designated 73) form part of the circuit of Fig. 5. Thus, it will be understood that automatic means may be provided for transferring the various impedances $B_1$—$B_2$ . . . $B_n$ into controlling relation with the bridge 35—36—38—39, and the signal-processing means 40 may, when permitted by transfer relay 75, supply repositioning signals for the cross-slide feed means or motor 22. I have shown threshold-adjustment means 76 also functioning from the output of the signal-processing means 40 and preferably so biased that relay 75 will be energized only when the output of signal-processing means 40 exceeds the adjusted threshold, meaning that the cross-slides will be thereby repositioned to the correct radius determined by the newly inserted reference potentiometer. Relay 75 is preferably of the delayed drop-out variety, so as to allow a sufficient time for subsidence of the balancing transients, and so that the probe-supporting means or pedestal 72 may be known for sure to have been properly referenced to the frame. Upon drop-out of relay 75, brake or clamping means may be activated to clamp the probe support or pedestal 72 to the traverse slide 14, but for simplicity I have not shown this function, on the assumption that the mass of the slide 72 and the friction of its support in guide means 15 may be sufficient to hold a referenced position for the probe 71.

Throughout the described positioning cycle for the slide 72, a lead-screw clutch 77 in the probe support 72 may maintain clutched engagement with feed means 70, as determined by actuation of solenoid 79 against the urging of a declutching spring 78. However, when the positioning signal derived from processing means 40 reduces to zero upon bridge balance, the signal will fail to exceed the threshold adjustment at 75, and solenoid 79 may be de-energized (preferably with a slight delay occasioned by the nature of solenoid 79) to declutch the probe support 71 from lead-screw 70, thus allowing the probe to be referenced to the frame. Thereafter, and until commencement of the next cycle of operations (i. e. referenced to the next reference potentiometer), the probe alone is used to generate the error signals upon which cross-slide feed-correcting movements are based, as will be made more clear.

Once the probe support is referenced to the frame and delayed relays or solenoids 79—75 have relaxed, further control of tool-supporting cross slide 16 may be under the sole control of a null-finding probe-operated sensing mechanism. In Fig. 4, I suggest that such mechanism may simply involve a differential coil 80 mounted on a bracket 81 forming part of the probe support 72, and the probe may variously position an iron slug or core 82 predominantly to one side or the other of the center of the differential coil 80 in order to provide directional unbalance in the respective output sides of the differential coil. The resulting signals may be treated in signal-processing means 84 for supply directly to the motor 22 and, of course, only relatively small positioning displacement, if any, will be called for during the progress of any single-radius cut. These displacements will ordinarily only involve take-up for tool wear, so as to amount to less than one turn of threaded advance of the lead screw 70 with respect to the then-disengaged clutching element 77; therefore, at the end of the traverse movement for the particular depth of cut determined by the then-selected reference potentiometer, a tripping abutment such as the abutment 23 may actuate transfer relay 75 and clutching solenoid 79, so that no basic reference is lost between the two cross slides on their common feed means. The selector for the reference potentiometers will have automatically indexed to the next reference setting, and the described cycle of events will repeat for the next pre-selected cutting radius.

It has been explained that Figs. 4 and 5 have been somewhat abbreviated in view of the more detailed showing in Figs. 1 and 2. In particular, automatic retraction means for the probe 71 have only been briefly suggested at 85 (Fig. 5), and it will be appreciated that in other respects such means may duplicate that provided at 48—49 for the probe 29 of Fig. 2. Probe retraction will (in the arrangement of Fig. 5) be understood to take place automatically whenever cross-slide feed control is transferred to the bridge circuit 35—36—38—39, that is, whenever relay 75 and solenoid 79 are energized.

As a safety feature in the arrangement of Fig. 5, it will be observed that cross-slide feed control may always be automatically returned to a reference potentiometer whenever an abnormally large error signal is detected in the probe-sensing circuit. Thus, if a large chip should suddenly displace the probe outwardly, or if the probe should suddenly "fall into" a hole due to casting imperfections, threshold-responsive means 86 may be actuated to energize relay 75 and solenoids 79—85. This circuit 86 may incorporate a hold-in or delayed drop-out feature to prevent too quick a return to probe control. This transfer of control to the bridge circuit, without indexing the stepping means 41, will be seen to permit the mechanism to "ride out" transient difficulties without damage to the probe or to the tool.

It will be seen that I have described a basically simple control mechanism for automatically insuring a desired depth of cut regardless of tool wear, set-up malalignments, or malfunctioning of the feed mechanism to which my automatic control is applied. Step-turning operations have, through my invention, been reduced to a relatively simple operating procedure, involving a minimum of set-up time, thus increasing the operating efficiency of any one machine. My invention can be equally well embodied in complete new machines, or readily adapted as an attachment to existing machines. The invention not only provides what in effect constitutes an electrical template with adjustable slopes, steps, and step lengths, but also assures that the cut itself, rather than the tool holder, shall be referenced to such template.

While I have described the invention in detail for the preferred forms shown, it will be understood that modifications may be made within the scope of the invention as described in the claims which follow.

I claim:

1. In a machine of the character indicated, work-supporting means, tool-supporting means, feed means for moving said supporting means relatively to each other, probe-supporting means, a work probe movably supported by said probe-supporting means and oriented to continuously track the cut of a tool on a piece of work, position-measuring means continuously responsive to the position of said probe, selectively variable reference-measuring means responsive to a selected reference setting, and means differentially responsive to both said measuring means and continuously in controlling relation with said feed means.

2. In a machine of the character indicated, work-supporting means, tool-supporting means, feed means for moving said supporting means relatively to each other, probe-supporting means, a work probe movably supported by said probe-supporting means and oriented to continuously track the cut of a tool on a piece of work, said feed means including a motor, means continuously electrically responsive to the position of said probe, reference means electrically responsive to a reference setting, and means electrically differentially responsive to said two last-defined means and continuously in controlling relation with said motor.

3. A machine according to claim 2, in which said reference means includes a selectively variable impedance and means for selectively varying the same, whereby the control effect on said motor produced by movement of said probe may be selectively varied.

4. In a machine of the character indicated, work-supporting means, tool-supporting means, feed means for moving said supporting means relatively to each other, probe-supporting means, a work probe movably supported by said probe-supporting means and oriented to continuously track the cut of a tool on a piece of work, means continuously electrically responsive to the position of said probe, reference means electrically responsive to a reference setting, and means electrically differentially responsive to said two last-defined means and continuously in controlling relation with said feed means.

5. A machine according to claim 4, in which said electrically responsive means includes threshold-operated means responsive to an electrical response above a given threshold and in disabling relation with said electrically responsive means.

6. In a machine of the character indicated, work-supporting means, tool-supporting means, feed means for moving said supporting means relatively to each other, probe-supporting means movable relatively to said work-supporting means, a work probe movably supported by said probe-supporting means and oriented to track the cut of a tool on a piece of work, first means electrically responsive to the position of said probe relatively to said probe-supporting means for connection in controlling relation with said feed means, second electrical means for connection in controlling relation with said feed means and for connecting said probe-supporting means to said feed means, and automatic connection-transfer means for transferring feed control from one to the other of said first and second electrical means.

7. A machine according to claim 6, in which said automatic means functions in response to attainment of a given feed position.

8. A machine according to claim 6, in which said automatic means includes threshold means functioning in response to an excessive probe-developed electrical response.

9. In a machine of the character indicated, work-supporting means having an orientation axis, tool-supporting means, cross and traverse feed means for two-component relative motions of said supporting means relatively to each other, probe-supporting means, means connecting said tool-supporting means and said probe-supporting means for bodily displacement in the same radial sense in reference to said axis, under control of one of said feed means, a work probe movably supported by said probe-supporting means and oriented to track the cut of a tool on a piece of work in the sense of movement derived from said feed means, said one feed means including a motor and electric-circuit means continuously electrically responsive to the position of said probe in said probe-supporting means, said circuit means being also in controlling relation with said motor.

10. In a machine of the character indicated, rotatable work-supporting means, a traverse slide, a tool-supporting cross slide and a probe-supporting cross slide, both said cross slides being carried by said traverse slide, a work probe movably supported by said probe-supporting cross slide and oriented to track the cut of a tool on a piece of work, separate feed means for said tool-supporting cross slide and for said traverse slide, first means electrically responsive to the position of said probe relatively to said probe-supporting cross slide for connection in controlling relation with said cross-slide feed means, second electrical means including an element responsive to position of said tool-supporting cross slide and for connection in controlling relation with said feed means, clutch means for selectively connecting said probe-supporting cross slide to said cross-slide feed means, and automatic connection-transfer means responsive to attainment of a preselected position of said traverse slide for transferring feed control from the first-mentioned to the second-mentioned of said electrical means and for simultaneously operating said clutch means to clutch said probe-supporting cross slide to said cross-slide feed means while said feed means is under control of said second-mentioned electrical means.

11. A machine according to claim 9, in which said electric-circuit means includes a variable impedance, and means for varying the magnitude of said impedance as a function of the progression of said other feed means.

12. In a machine of the character indicated, work-supporting means, tool-supporting means, cross and traverse feed means for two component relative motions of said supporting means relatively to each other, probe-supporting means, a work probe movably supported by said probe-supporting means and oriented to continuously track the cut of a tool on a piece of work, the movement of said probe including a component in the general direction of movement of one of said feed means, said one feed means including a motor and means electrically responsive to the position of said probe and in controlling relation with said motor, said last-defined means including a first reference impedance and a second reference impedance, and control means responsive to a position of the other of said feeds and transferring said first reference impedance out of and said second reference impedance into controlling relation with said motor.

13. A machine according to claim 12, in which said last defined means includes stop means responsive to a position of said other feed for interrupting said other feed when transferring from said one impedance to said other impedance, whereby said one feed may have a period of time in which to transfer from a position controlled by said first reference impedance to a position controlled by said second reference impedance, and means reestablishing said second feed upon accomplishment of the transfer to said second position of said one feed.

14. In a machine of the character indicated, rotatable work-supporting means on a longitudinally extending axis tool-supporting means including a traverse slide and a cross slide, separate feed-means for both said slides, radially movable work-follower means retained against longitudinal movement with respect to said traverse slide and oriented to track the cut of a tool on a piece of work during traverse movement, an electrical bridge including in one arm thereof an impedance variable in response to the radial position of said work-follower means, a plurality of preset reference impedances available for connection in another arm of said bridge, means connecting the output of said bridge in reversible controlling relation with said cross-slide feed means, whereby the phase of the output of said bridge may determine the direction of movement of the cross-slide feed, and means responsive to traverse movement for transferring connections in said other arm from one of said plurality of reference impedances to another impedance of said plurality.

15. In a machine of the character indicated, rotatable work-supporting means, tool-supporting means including a traverse slide and a cross slide, separate feed means for both said slides, movable work-follower means oriented to track the cut of a tool on a piece of work, an electrical bridge including in one arm thereof a variable resistance responsive to the position of said work-follower means, a second variable resistance in another arm of said bridge, means responsive to traverse feed for varying said second resistance, and a control connection from the output of said bridge to said cross-slide feed means.

16. In a machine of the character indicated, work-supporting means, means for rotating said work-supporting means about a turning axis, a traverse slide and feed means therefor, a cross slide and feed means therefor, a work probe movably supported on said traverse slide and independent of movement of said cross slide and oriented to track the cut of a tool on a piece of work, means electrically responsive to the position of said probe, and selectively variable reference means electrically responsive to a reference setting, said cross-slide feed means including means electrically differentially responsive to said two last-defined means.

17. In a machine of the character indicated, rotatable work-supporting means, a traverse slide, a tool-supporting cross slide and a probe-supporting cross slide, both said cross slides being carried on said traverse slide, feed means for said cross slides and including a differential lead screw having a first set of threads for driving one cross slide and a second set of threads for driving the other cross slide, and control means for positioning said tool-supporting cross slide, said control means including a bridge with a first impedance in one arm thereof and responsive to the position of one of said cross slides, a selectively variable reference impedance in another arm of said bridge, means for driving said differential screw in response to the output of said bridge and in a direction to balance said bridge, whereby drive will cease when the bridge is balanced, means responsive to bridge balance for declutching said probe-supporting cross slide from said lead screw upon attainment of bridge balance, a probe movably carried by said probe-supporting cross slide and oriented to track the cut of a tool on a piece of work, and further control means including a probe and referenced to said probe-supporting cross slide and responsive to movement of said probe and connected in controlling relation with said feed means upon attainment of bridge balance.

18. A machine according to claim 17, in which said further control means includes null-finding electrical means.

19. In a machine of the character indicated, a frame work-supporting means and means for rotating the same about a frame-based turning axis, tool-supporting means including a traverse slide and a cross slide supported thereon for positioning a tool in operative relation with work carried by said work-supporting means, and independent feed means for said slides, probe means carried by said traverse slide and including a movable probe oriented to track the actual cut of the tool on the work, control means for said cross slide, the feed means for said cross slide including an electrical bridge including in one arm thereof a variable resistance responsive to probe position, a plurality of separate resistors, and trip means coacting between parts carried by said traverse slide and by said frame for serially inserting selected of said resistors in another arm of said bridge, said last-defined means including a plurality of adjustable stops responsive to traverse position and in controlling relation with said means for selectively connecting said resistors.

20. A machine according to claim 19, and including means for retracting said probe away from the work, said retracting means including a control connection to the selective connecting means for said resistors, whereby said probe may be momentarily retracted during a transfer of cross-feed position.

21. In a machine of the character indicated, work-supporting means, tool-supporting means, feed means for moving said supporting means relatively to each other, probe-supporting means including a work probe movably supported thereby and oriented to track the cut of a tool on a piece of work, first means electrically responsive to the position of said probe, frame-based reference means, means electrically differentially responsive to said electrically responsive means and to said reference means and for connection in controlling relation with said feed means, second means electrically differentially responsive to the position of said probe and to the position of said tool-supporting means and for connection in controlling relation with said feed means, and connection-switching means for transferring feed control from one to the other of said first and second electrically responsive means upon attainment of a given balance condition in the differentially responsive means associated with said one of said first and second electrically responsive means.

22. In a machine of the character indicated, work-supporting means, tool-supporting means, feed means for moving said supporting means relatively to each other, probe-supporting means including a work probe movably supported thereby and oriented to track the cut of a tool on a piece of work, first means electrically responsive to the position of said probe and for connection in controlling relation with said feed means, second means electrically responsive to the position of said tool-supporting means and for connection in controlling relation with said feed means, connection-switching means for transferring feed control from one to the other of said first and second electrically responsive means, and threshold means responsive to a feed-control signal above threshold in said first electrically responsive means and actuating said connection-switching means to connect said second electrically responsive means in controlling relation with said feed means.

23. In a machine of the character indicated, work-supporting means, tool-supporting means, feed means for moving said supporting means relatively to each other, probe-supporting means including a work probe movably supported thereby and oriented to track the cut of a tool on a piece of work, first means electrically responsive to the position of said probe and for connection in controlling relation with said feed means, second means electrically responsive to the position of said tool-supporting means and for connection in controlling relation with said feed means, connection-switching means for transferring feed control from one to the other of said first and second electrically responsive means, and threshold means responsive to a feed control signal above threshold in said second electrically responsive means and actuating said connection-switching means to maintain a connection of said second electrically responsive means in controlling relation with said feed means.

24. In a machine of the character indicated, work-supporting means, tool-supporting means, feed means for moving said supporting means relatively to each other, probe-supporting means including a work probe movably supported thereby and oriented to track the cut of a tool on a piece of work, probe-retracting means, first means electrically responsive to the position of said probe and for connection in controlling relation with said feed means, second means electrically responsive to the position of said tool-supporting means and for connection in controlling relation with said feed means, connection-switching means for transferring feed control from one to the other of said first and second electrically responsive means, and threshold means responsive to a feed-control signal above threshold in said second electrically responsive means and actuating said probe-retracting means to retract said probe.

25. A machine according to claim 24, and in which said probe-retracting means includes means for extending said probe from retracted position upon a drop in said feed-control signal substantially to threshold level.

References Cited in the file of this patent

UNITED STATES PATENTS

| | | |
|---|---|---|
| 915,671 | Hanson | Mar. 16, 1909 |
| 1,835,459 | Brittain | Dec. 8, 1931 |
| 1,992,027 | Green | Feb. 19, 1935 |
| 2,245,894 | Arms | June 17, 1941 |
| 2,264,095 | Mohler | Nov. 25, 1941 |
| 2,293,502 | Hermann | Aug. 18, 1942 |
| 2,372,427 | Johnson | Mar. 27, 1945 |
| 2,374,365 | MacNeill | Apr. 24, 1945 |
| 2,450,096 | Siekmann | Sept. 28, 1948 |
| 2,457,558 | Hornfeck | Dec. 28, 1948 |
| 2,481,993 | Fuss | Sept. 13, 1949 |
| 2,557,824 | Hornfeck | June 19, 1951 |
| 2,640,274 | Crosby | June 2, 1953 |
| 2,647,348 | Hahn | Aug. 4, 1953 |